April 23, 1940.  F. FAHLAND  2,198,155
SUPPORTING STRUCTURE FOR RAILWAY CARS AND LIKE VEHICLES
Filed Dec. 21, 1939  4 Sheets-Sheet 1

Inventor
Frank Fahland
By Dodge and Sons
Attorneys

April 23, 1940.　　　F. FAHLAND　　　2,198,155
SUPPORTING STRUCTURE FOR RAILWAY CARS AND LIKE VEHICLES
Filed Dec. 21, 1939　　　4 Sheets-Sheet 2
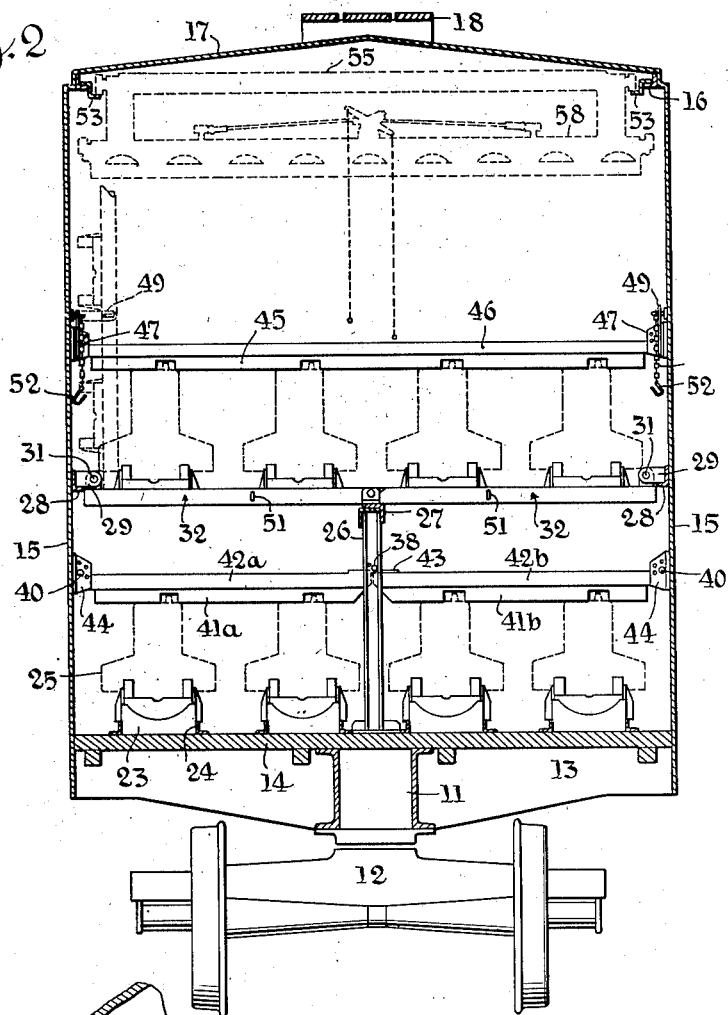
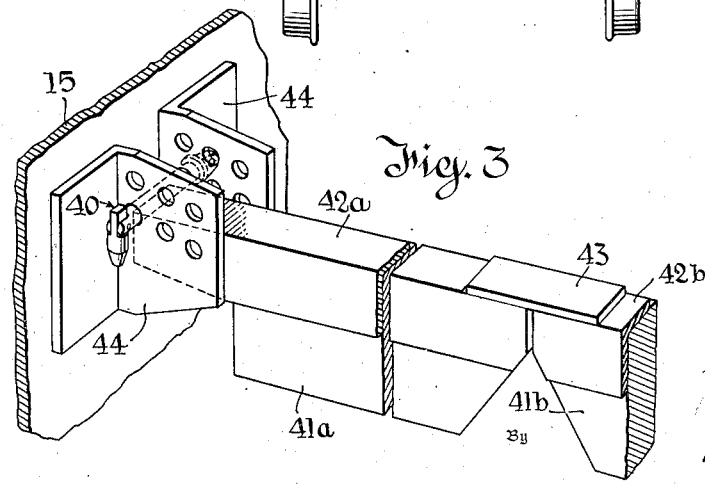
Inventor
Frank Fahland
By Dodge
Attorneys

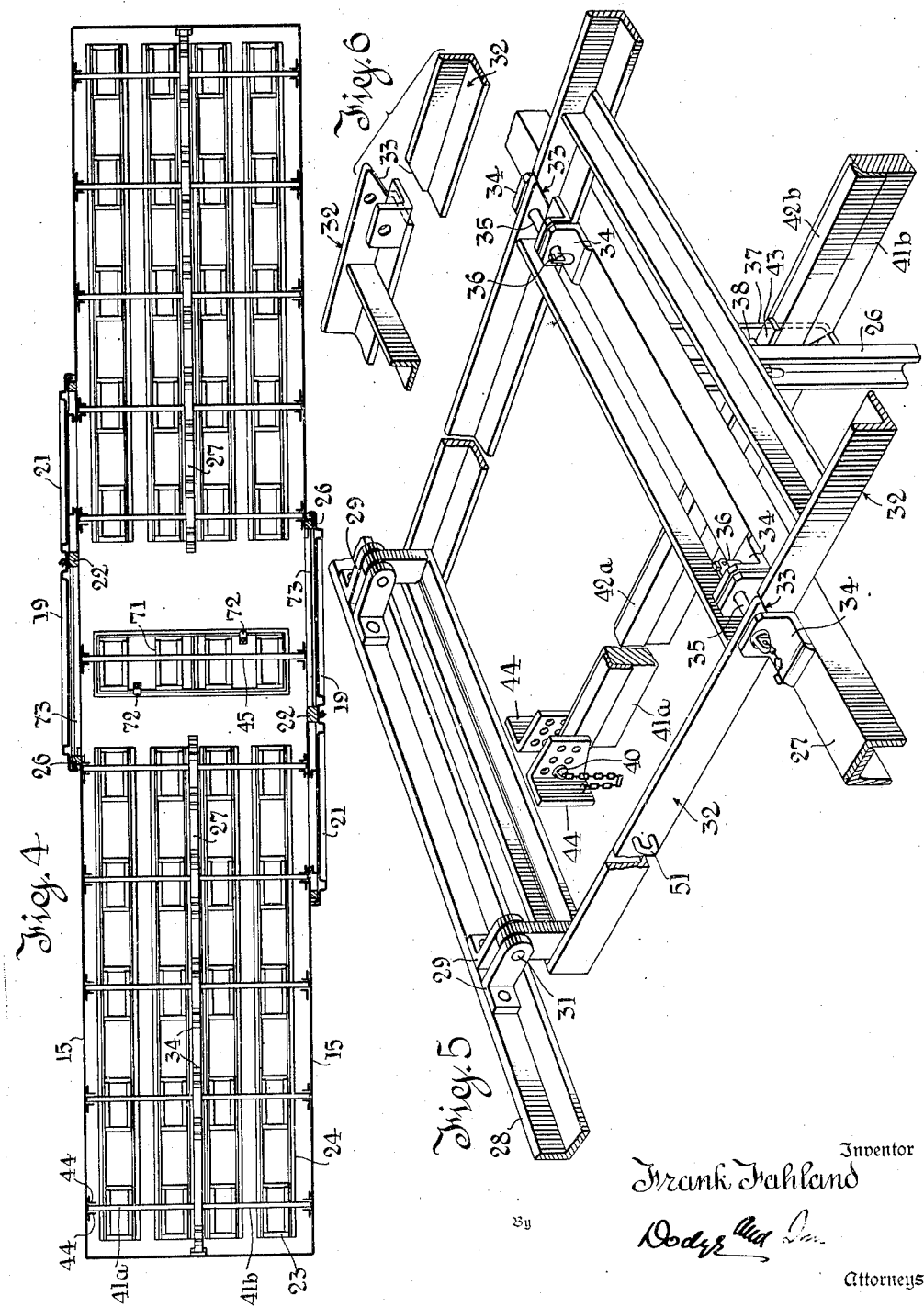

April 23, 1940.   F. FAHLAND   2,198,155
SUPPORTING STRUCTURE FOR RAILWAY CARS AND LIKE VEHICLES
Filed Dec. 21, 1939   4 Sheets-Sheet 4
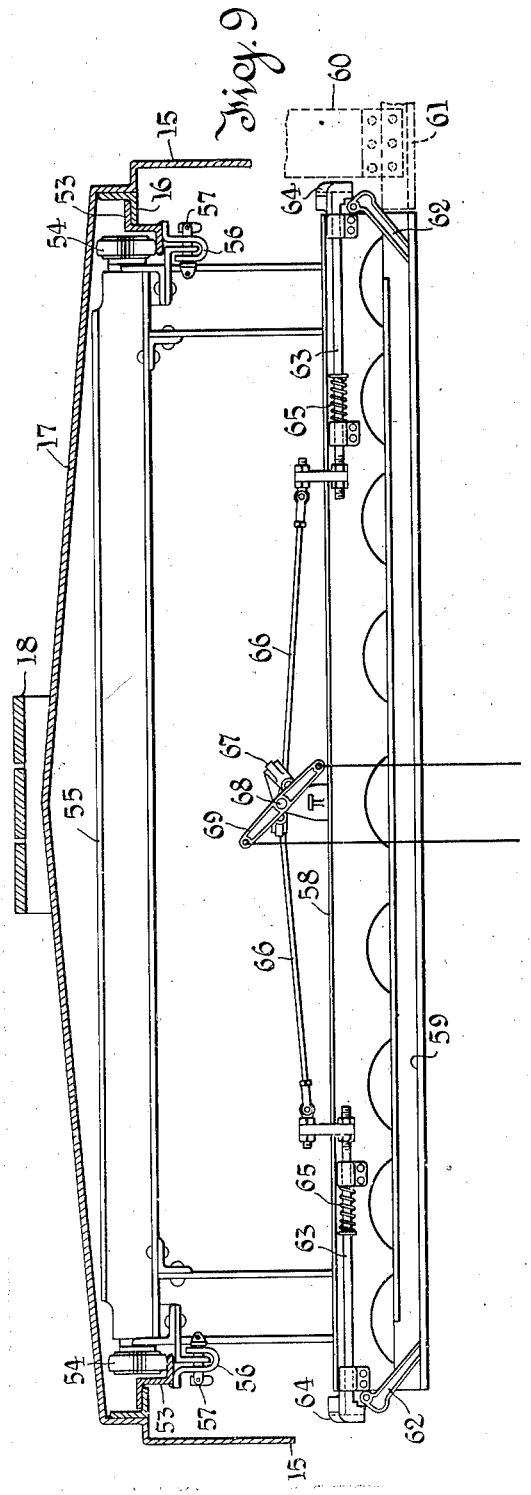
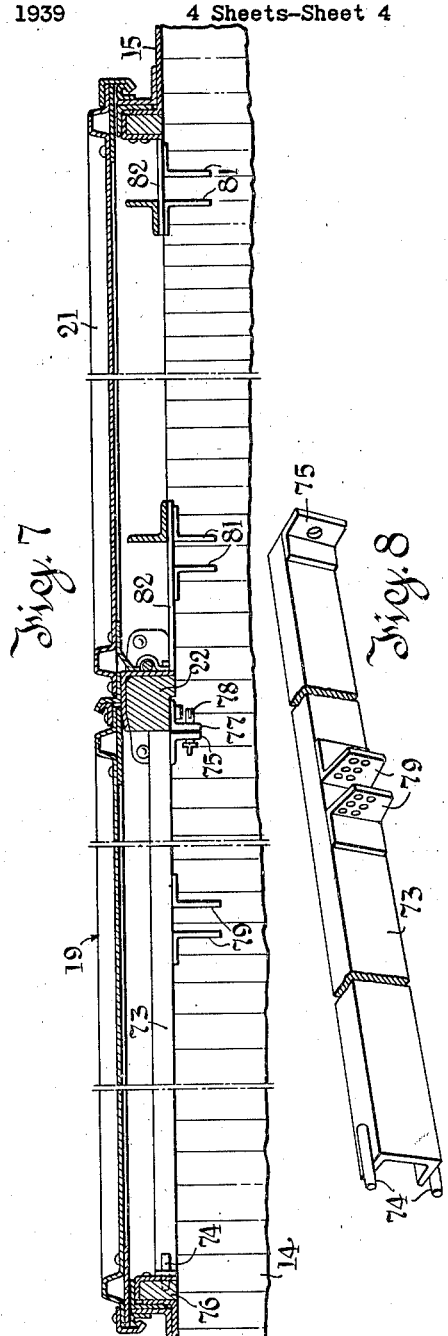
Inventor
Frank Fahland
By
Attorneys Patented Apr. 23, 1940

2,198,155

UNITED STATES PATENT OFFICE 2,198,155

SUPPORTING STRUCTURE FOR RAILWAY CARS AND LIKE VEHICLES

Frank Fahland, Omaha, Nebr., assignor to Union Pacific Railroad Company, Omaha, Nebr., a corporation of Utah Application December 21, 1939, Serial No. 310,431

5 Claims. (Cl. 105—367)

This invention relates to special supporting structures adapted for use in railway cars and like vehicles. The purpose is to facilitate the shipment in a specially equipped box car of a large number of manufactured articles such as automobile engines, which are heavy, which are substantially identical, and which must be positively positioned against shifting during transit.

The invention, as illustrated, permits the shipment in an ordinary box car of eighty-four automobile engines of well-known form. The engines are stored in the car in two tiers, one above the other and in specially constructed permanent cradles. In loading the car in this manner, the problem is to permit the upper tier of engines to be loaded without damage to or interference by the engines in the lower tier.

According to the preferred embodiment, forty engines are stored in each end of the car between the end of the car and the usual side door. The lower tier of engines consists of four longitudinal rows of five engines each, mounted with their crank shafts approximately aligned. To support the engines, four rows of five cradles are provided, the cradles being dimensioned to leave aisles extending lengthwise of the car between the cradles. In the center aisle, there is constructed a steel framework or bridge which is directly over and hence supported by the center sill of the car. This bridge supports the centers of the upper deck sections when these are lowered to active position.

Thus, the engines are arranged in rows extending lengthwise of the car and also in rows extending cross-wise. For each cross-wise row of engines, there is an individual cross-wise deck section made up of two parts each of which is preferably hinged to the corresponding side wall of the car, the two parts when lowered resting on the central longitudinal bridge and being attached thereto by toggle bolts. The engines of each cross row in each tier are held down by a cross bar which is adjustably attached to the sides of the car and rests upon the tops of the engines. Thus, the engines are positively positioned but are not bolted in place.

The procedure in loading is to mount the engines of bottom cross-wise row on the cradles at one end of the car, fix the corresponding hold-down cross-bar in position and then lower the upper deck sections for the end row and place the four engines on the upper deck, after which these engines are retained by mounting a second cross-bar.

The second row of engines is then mounted on the floor, followed by the second row on the upper deck, and so on, until the lower and upper rows adjacent the doorway have been placed. After both ends of the car are thus loaded, a removable cradle for four engines is fastened to the floor of the car between the doors and loaded with engines.

To facilitate the loading operation, a traversing crane is mounted on tracks carried by the plates of the car in position to move lengthwise of the car clear of all deck sections. This crane structure carries a cross track which may align with the track of a dock hoist mounted above the loading platform at the station where the cars are being loaded. In this way, the dock hoist may enter the car and be carried by the car crane lengthwise of the car into positions above any selected cradle.

The advantages of the scheme are that nothing is removed from the car in loading or unloading except the single four-engine cradle mounted in the space between the doorways. Loading may proceed rapidly. The danger of injury to the engines is minimized and so is the risk of injury to personnel engaged in loading and unloading.

A preferred embodiment of the invention will now be described with reference to the accompanying drawings, in which—

Figure 1 is a vertical axial section through a car equipped with the invention and indicating in dotted lines how the loading proceeds from the end toward the middle of the car. Certain of the upper deck units are shown in load-supporting position and others are shown in raised or idle position.

Figure 2 is a transverse section through the car. Upper and lower transverse rows of engines are indicated in dotted lines. The raised position of one upper deck section is indicated in dotted lines, as is the traversing crane, the purpose being to indicate clearance between the crane and the upper deck sections.

Figure 3 is a perspective view indicating the construction and mounting of a hold-down bar for the lower tier of engines.

Figure 4 is a sectional plan view showing the location of the cradles and the bridge with reference to the car structure.

Figure 5 is a perspective view showing the upper deck section and a lower hold-down bar, and indicating how these are supported on the side walls of the car and also on the central bridge structure.

Figure 6 is a fragmentary section indicating the mating action of the two parts of the upper deck section of Figure 5.

Figure 7 is a horizontal section through the doorway showing a removable cross bar which is used to hold the ends of the hold down bar of the center group of four engines.

Figure 8 is a perspective view of the removable bar shown in Figure 7.

Figure 9 is a section through the upper part of the car showing the general form of the crane and mode of supporting the same.

Figure 1:
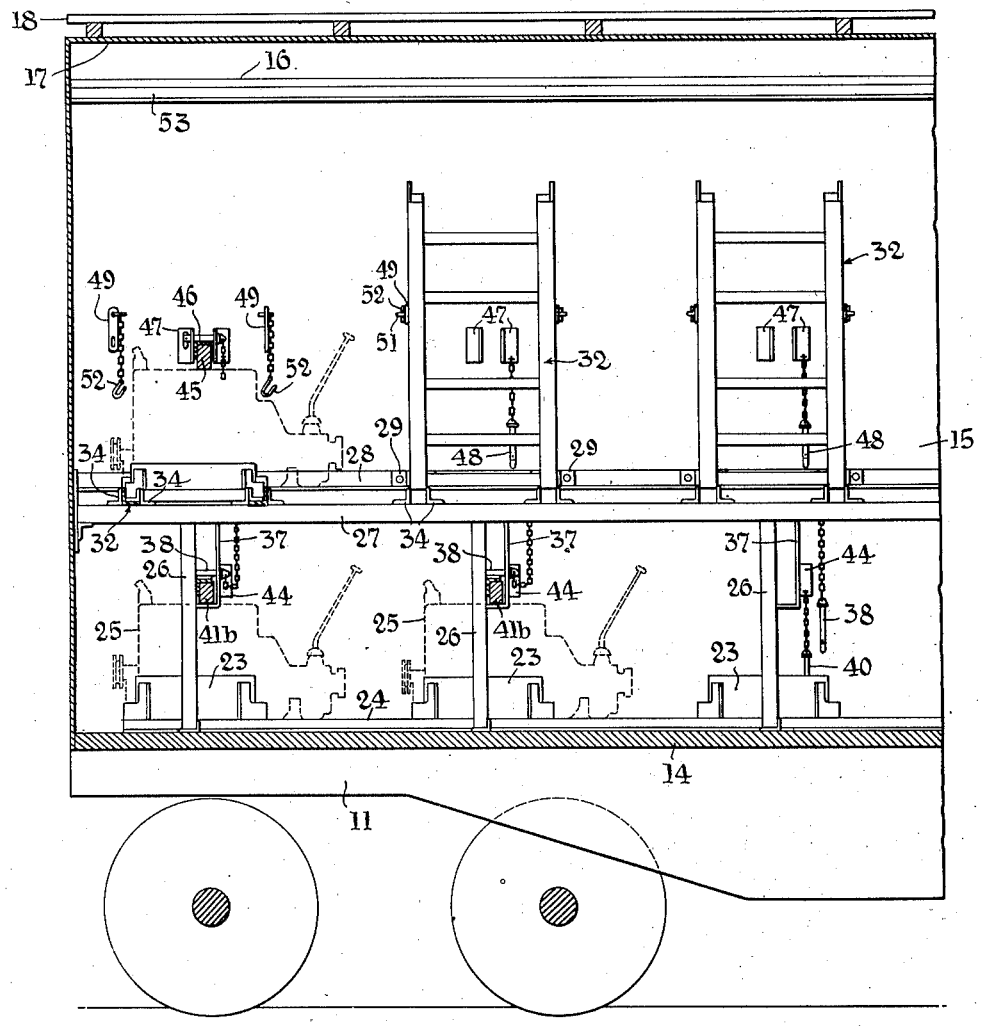

Referring first to Figures 1 and 2, 11 represents the center sill structure of a car. This center sill is supported near its ends on four wheel trucks very generally indicated at 12. The center sill 11 carries cross frames 13, and on this supporting structure (which may be varied within the limits of standard practice), is mounted the car body which for present purposes need be only generally described. The car body comprises a floor 14, side walls 15, a reinforcing angle bar 16 which may be called the "plate," a roof 17 and on the roof the usual longitudinal walk 18.

Referring to Figure 4, the car has near its mid-length two main doors 19 which are approximately opposite each other. The car chosen for illustration happens to be an automobile car with off-set auxiliary doors 21, each adjacent a corresponding main door and separated therefrom by a door post 22 which is ordinarily removable. However, the present invention makes no use of the auxiliary doors 21, and the supporting structures for the upper deck are built across them. Illustration of the doors 21 merely indicates the possibility of using the invention with a car of this type, for the presence of the auxiliary doors 21 is in no way necessary to the invention.

Mounted on the floor 14 of the car are a series of cradles 23, all of which are identical. They are constructed of wood and are attached to the floor by angle irons 24, which are continuous and connect the cradles in longitudinal groups. In the examples shown, there are four rows of five cradles, each, and the cradles are designed to fit the bases of automobile engines which are outlined in dotted lines in certain of the figures, and which will be indicated by the reference numeral 25.

The form of the cradle is dependent on the form of the engine or article to be shipped, and all that is necessary is that it support the engine and restrain the lower part of it against horizontal movement in any direction. The cradles 23 are spaced apart, leaving a center aisle between the two inner rows and a side aisle between each of the inner and outer rows of cradles. The side aisles give walking space for the person who loads the engines. The center aisle is taken up by a bridge structure comprising a series of columns 26 shown of channel steel, and a horizontal cap girder 27 which is shown as made of two angle sections (see Fig. 5). The girder 27 is rigidly connected to the tops of the columns 26 and is connected at its end to the end wall of the car.

The function of the bridge is to carry at least half the load of the upper tier of engines and transmit it as directly as possible to the center sill 11 which is the major supporting element of the car. In this way the side walls of the car are not unduly loaded.

The upper deck is not a single continuous deck, but is made in a plurality of spaced sections, one for each cross-row of engines. Each section is formed by two halves hinged to opposite sides of the car. A reinforcing angle bar 28 is attached to the side walls 15 of the car by welding or riveting, and carries a plurality of brackets 29. To these are hinged at 31 the rectangular frames 32. The frames are preferably constructed of angle iron and a pair made up of two frames hinged to opposite sides of the car have a scarfed overlap when they rest on the bridge beam 27, as indicated at 33 in Figures 5 and 6.

The overlapping ends are prevented from moving in the direction of the length of the girder 27 on which they rest by the angle braces 34 between which the ends of the upper deck frames enter. They are pinned to the brackets 34 by a bolt 35 which has a so-called "toggle" 36 pivoted in its end. The bolt is readily inserted and the toggle is a simple means for preventing its accidental withdrawal.

Thus, when the two upper deck sections are loaded, they are supported partly by the side walls of the car and partly by the center bridge. The important fact is that the upper deck sections for each cross-wise row of engines can be folded out of the way to permit personnel to move down the two aisles. When moved out of the way, they must not interfere with the crane hereafter described.

Within those limits, the mode of mounting the upper deck sections is subject to considerable variation. The simplest and most compact arrangement is to hinge them to the side walls so that they swing upward to their inactive position. Various other arrangements will suggest themselves, and in its broader aspects, the invention is not limited to any particular detail of the hinged mounting.

It is necessary to hold the engines 25 in the cradles 23 and since the engines are confined laterally and longitudinally by the cradles, a hold-down bar is sufficient. For the lower tier of engines, it would be difficult to use a one-piece hold-down bar extending the entire width of the car, because of possible interference with the bridge structure. Consequently, for the lower tier of engines, a two-part hold-down bar is used, and the column members 26 for the bridge are so spaced as to offer support for such hold-down bars. To effect this result, each of the columns 26 is aligned with a transverse row of cradles 23, and carries on its side a rectangular frame 37 designed to receive the inner ends of the two-part hold down bar. This is retained by the removable toggle bolt 38 which is similar to the bolt 35 already described. The two-part hold-down bar is indicated in Figures 3 and 5. Each part comprises a wooden beam 41a, 41b, as the case may be, with a stiffening and reinforcing angle 42a, 42b. Welded to the angle 42a is a lap strip 43 which, when the hold-down bar is in place, overlaps the angle 42b and engages the hold-down bolt 38 (see Fig. 1).

The connection to the side wall 15 of the car is provided by two angle clips 44, each with stepped series of holes which receive a toggle bolt 40, also similar to the toggle bolt 35. The hold down bars retain the engines 25 in their respective cradles and because of the adjustability afforded by the clips 44, can be made to fit sufficiently closely for this purpose.

The upper hold-down bar consists of a continuous wooden beam 45 with angle stiffening 46. It is connected adjustably at its ends to clips 47 with toggle pin 48 identical with the parts 44, 40, already described.

When the upper deck sections are swung upward to inactive position, they are retained by hasps 49 which engage staples 51 on the sections and are retained by hooked retainers 52 which are attached by chains as shown. Provision of reliable means to hold the upper deck sections in their upper position is important because in the progress of unloading a car, the upper deck sections are swung to inactive position so that when unloading is completed, they are all in inactive position. Since they need not be lowered until the next loading operation is in progress, and the car must be moved from the point of unloading to the point of loading, the retaining means must be adequate to hold the platforms in inactive position while the car is in transit. Otherwise, it would be necessary to go through the useless labor of lowering all the deck sections before the car was moved.

To facilitate loading, a traversing crane is provided which is movable from end to end of the car. To each plate 16 is welded a Z-bar 53 which serve as tracks for the rollers 54 of an ordinary traversing crane whose beam is indicated at 55. Clips 56, with removable toggle bolts 57 are used to hold the crane in a definite position when the car is in transit. Suspended by hangers from the beam 55 is a cross-girder 58 with a lower flange 59. This may align with an extensible portion 61 of the track of a deck hoist on the loading platform, so that the hoist (not shown) may be rolled into the car. The portion 61 is commonly hinged relatively to the deck track and is carried by a hanger 60 so as to be capable of being swung to an active position in which it projects directly inward through the car door. Latch members 62 are mounted at each end of the track 59 to prevent the hoist from running off the end of the track accidentally.

To latch the track 59 in alinement with the portion 61 a pair of plungers 63 carry notched heads 64 and are each urged in a direction to engage hanger 60 (i. e., outward) by corresponding coil compression springs 65. To retract, and thus disengage the latch heads 64, a pair of toggle links 66 are connected to the plungers 63 and to toggle levers 67 carried by a shaft 68. A cross arm 69 with pendant rope pulls is provided to permit rocking of the shaft 68 between two positions, in one of which the springs 65 are free to project the latch heads, and in the other of which the arms 67 carry the toggle links 66 past center so as to retain the latches in disengaged positions.

The procedure in loading is to start with an end-most cross-wise row on the floor, then lower the upper deck sections above that row and place the upper row. After each row is placed, the hold-down bar is placed. Then the next bottom row is placed, followed by its upper row, and so on, until both ends of the car have been filled to the doorway. After this has been accomplished, a transverse row of four cradles 71 is clamped to the floor by means of releasable clips 72. The cradles 71 are essentially similar to the cradles 23 already described. Then a member 73 (see Figs. 7 and 8) is mounted across each doorway. The member 73 is simply a channel iron with two lugs 74 welded to one end, and an angle clip 75 welded to the other. The lugs 74 enter openings formed in one door-post 76 and the clip 75 is pinned to a clip 77 on the other doorpost, by means of a toggle bolt 78. At the proper point on the members 73 are mounted clips 79 similar to the clips 44 and used in connection with a hold-down bar which is identical with the bars 45, 46, and consequently is given the same reference numeral.

In Figure 7, clips 81 similar to clips 79 and 44 are shown mounted on members 82 which project over the doorways of doors 21. The angles 28 extend across these doorways.

Upon inspection of Figure 2, it will be observed that the crane is above the uppermost limit of the upper deck sections even when the latter are raised. This is important because the crane must be movable from the door to the end of the car while certain of the sections are in raised position.

The structure is inexpensive to manufacture, transmits at least half the load of the upper tier directly to the center sill, affords ample walking space for the personnel to pass the unloaded cradles to points of loading, permits the use of the dock crane without interference by the upper deck sections and generally affords means for greatly expediting the loading and unloading operations, with consequent reduction of damage to the engines or other articles being loaded, and with less risk of injury to personnel.

What is claimed is:

1. The combination of a closed vehicle body having a center sill; cradles mounted on the floor of the body in spaced longitudinal rows providing a center aisle and at least one side aisle between the rows, said cradles being also approximately aligned in transverse rows and each cradle being adapted to afford a confining seat for a corresponding one of a plurality of substantially identical articles undergoing shipment; a central bridge extending down said center aisle and at least partially supported by said center sill; a series of upper deck units each shiftable between an inactive position in which it offers no obstruction to travel through said side aisles and an active position in which it extends over said side aisles and is supported partly by said bridge and partly by the side walls of the body; transverse rows of cradles one carried by each such deck unit; and hold-down bars adjustably connected at their ends to the side walls of the body, each bar overlying a transverse row of cradles and serving to position fixedly in the cradles a row of substantially identical articles to which the cradles offer confining seats.

2. The combination of a closed vehicle body having a center sill; cradles mounted on the floor of the body in spaced longitudinal rows leaving a center aisle and at least one side aisle between rows, said cradles being also approximately aligned in transverse rows and each cradle being arranged to offer a confining seat to one of a plurality of substantially identical articles undergoing shipment; a center bridge extending down said center aisle and supported at least in part by said center sill; a series of upper deck units each composed of a pair of sections hinged to swing between a vertical inactive position in which they do not extend across said side aisles and a horizontal position in which they are supported in part by said center bridge and in part by the side walls of the body; transverse rows of cradles one carried by each upper deck unit of the series; and hold-down bars adjustably connected at their ends to the side wall of the body, each bar overlying a transverse row of cradles and serving to position fixedly in the cradles a row of identical articles to which the cradles offer confining seats.

3. The combination defined in claim 2 in which the upper deck sections are hinged to the side wall of the body, and when lowered rest upon the bridge and are releasably connected thereto.

4. The combination with a structure as defined in claim 1 and in which the body is of the conventional freight car type with side doors near mid-length and the cradles and deck sections are mounted in the end portions of the car beyond said side doors, of a removable cradle unit insertable through the side door after the two end portions of the car have been loaded; and releasable means for fixing said cradle unit in place.

5. The combination of a closed vehicle body having a center sill; cradles mounted on the floor of the body in spaced longitudinal rows leaving a center aisle and at least one side aisle between rows, said cradles being also approximately aligned in transverse rows and each cradle being arranged to offer a confining seat to one of a plurality of substantially identical articles undergoing shipment; a center bridge extending down said center aisle and supported at least in part by said center sill; a series of upper deck units each composed of a pair of sections hinged to swing between a vertical inactive position in which they do not extend across said side aisles and a horizontal position in which they are supported in part by said center bridge and in part by the side walls of the body; transverse rows of cradles one carried by each upper deck unit of the series; hold-down bars adjustably connected at their ends to the side wall of the body, each bar overlying a transverse row of cradles and serving to position fixedly in the cradles a row of identical articles to which the cradles offer confining seats; and positive retaining means for fixing said upper deck units in their inactive positions, whereby a car may be returned to the loading point, after unloading, with such units in such positions.

FRANK FAHLAND.